United States Patent Office 3,055,099
Patented Sept. 25, 1962

3,055,099
METHOD OF CONTACTING SEMI-CONDUCTOR DEVICES
Heinz-Günther Plust, Wettingen (AG), and Erich Weisshaar, Neuenhof (AG), Switzerland, assignors to Aktiengesellschaft Brown, Boveri & Cie, Baden, Switzerland, a joint-stock company
No Drawing. Filed Oct. 3, 1960, Ser. No. 59,814
Claims priority, application Switzerland Oct. 15, 1959
2 Claims. (Cl. 29—501)

The invention relates to semi-conductor devices, for example, rectifiers and transistors, which contain a semi-conductor body, partly alloyed with gold as an alloying substance, and refers more particularly to the "contacting," that is, the mechanical and electrical connection of a feed wire with the alloyed portion of the semi-conductor body.

It is known to use for this type of contacting a solder that consists of a gold-lead alloy or of a gold-lead-antimony-alloy. These solders must be heated to temperatures of 250 to 300° C. so that they sufficiently wet the end of the feed wire to be connected with the semi-conductor body, which consists for example, of copper. But if such a solder is brought to this temperature, it dissolves the entire gold found on the semi-conductor surface and forms with it a homogeneous melt which extends down to the recrystallization front of the semi-conductor material. This results in various disadvantages for the rectifier: (1) Due to the different surface tension of the gold, which had been in contact with the recrystallization front, and the resulting homogeneous lead-gold-melt, existing minor gaps are not filled, because of the ragged form of the recrystallization front. This means that the transition solder-crystallization front contains holes. (2) The different coefficients of expansion of the gold, which had been at the boundary surface, and the new alloy resulting from the homogeneous melt on cooling leads to a mechanical stress of the semi-conductor body in the recrystallization range, which influences adversely its mechanical stability as well as that of the pn-transition. (3) The above mentioned solders become very brittle and rigid by the absorption of gold and lose thus the properties of a ductile joining member between the brittle semi-conductor body, particularly the electrically important recrystallization, and pn-range, and the feed wire to be connected with it whose cross section is relatively large, properties which are necessary to prevent mechanical damages.

These disadvantages can be reduced if the contacting is effected at lower temperature. This has the result that not the entire gold is dissolved in the solder. On the other hand, however, the wetting of the feed wire is poorer and produces a joint with insufficient properties. Besides, the brittling of the solder by the absorption of gold is only reduced, but not eliminated. The danger of damages to the semi-conductor body by mechanical stress of the feed wire continues to exist.

This invention is predicated on the concept of using a solder whose melting temperature increases constantly when it absorbs gold, in such a way that it contains not more than about 10% gold in solution at a temperature of 300° C. The hardness of the solder is not to change. In addition, the solder should naturally be ductile and wet sufficiently the material of the feed wire. It has been found that a lead-cadmium alloy with a eutectic composition (85.5% lead) meets these requirements. The method according to the invention is characterized in that it uses the above-mentioned alloy as a solder.

For carrying out the method, a disk formed from the above-mentioned alloy can be put between the gold-alloyed side of the semi-conductor body and the surface of the feed wire to be connected with it, and subsequently the whole be brought to a temperature of 250 to 300° C. The solder melts, but in contrast to the known solders, it absorbs only from 0 to 10% of its own weight of gold in solution, depending on the temperature used. Consequently only a superficial portion of the gold surface will be removed and the existing good electrical and mechanical properties of the pn-transition zone remain uninfluenced. It is also to be noted that despite the absorption of gold, the ductility of the solder remains practically unchanged, and it meets thus the necessary requirement of being a ductile connecting element.

We claim:
1. Method of contacting a semi-conductor device comprising a semi-conductor body having a side partly alloyed with gold as the alloying substance, comprising the steps of applying a lead-cadmium alloy with an eutectic composition as solder to the gold-alloyed side of the semi-conductor body and to the copper lead wire to be connected with it, and heating the assembly to a temperature of between 250 and 300° C.

2. Method of contacting a semi-conductor device comprising a semi-conductor body having a side partly alloyed with gold as the alloying substance, comprising the steps of placing a disc of lead-cadmium alloy with an eutectic composition between and in contact with the gold-alloyed side of the semi-conductor body and the surface of the copper lead wire to be connected with it, and heating the assembly to a temperature of between 250 and 300° C.

References Cited in the file of this patent
UNITED STATES PATENTS

| | | |
|---|---|---|
| 2,829,422 | Fuller | Apr. 8, 1958 |
| 2,878,148 | Beale | Mar. 17, 1959 |
| 2,908,851 | Millea et al. | Oct. 13, 1959 |